Nov. 8, 1960 J. O. CHERTKOF 2,958,946

DEVICE FOR TAKING IMPRESSIONS

Filed March 2, 1959 2 Sheets-Sheet 1

INVENTOR.
Jack O. Chertkof
BY Robert [signature]
ATTORNEY

Nov. 8, 1960 J. O. CHERTKOF 2,958,946
DEVICE FOR TAKING IMPRESSIONS
Filed March 2, 1959 2 Sheets-Sheet 2
Fig. 14.
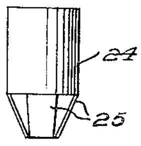
Fig. 16.
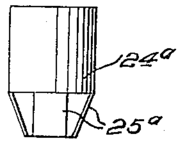
Fig. 18.
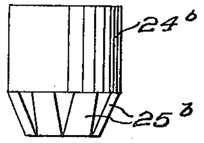
Fig. 20.
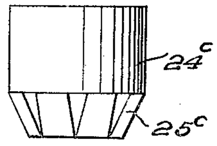
Fig. 15.
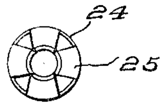
Fig. 17.
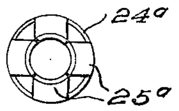
Fig. 19.
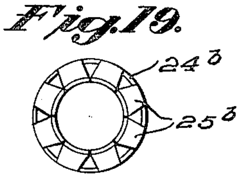
Fig. 21.
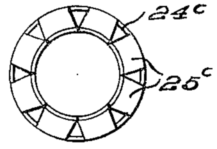
Fig. 22. Fig. 23. Fig. 24. Fig. 22-A. Fig. 23-A. Fig. 24-A.
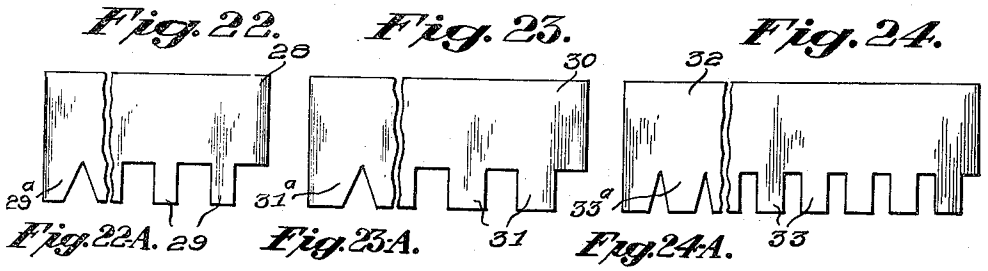
Fig. 25. Fig. 25-A.
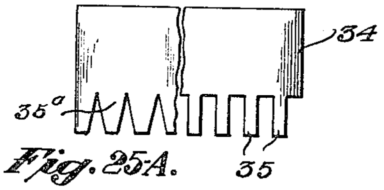
Fig. 26. Fig. 26-A.
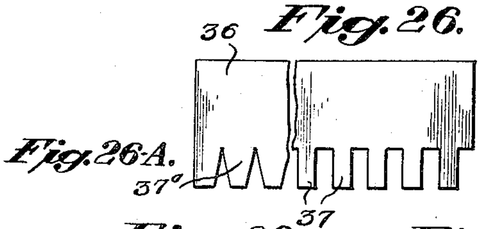
Fig. 27. Fig. 27-A.
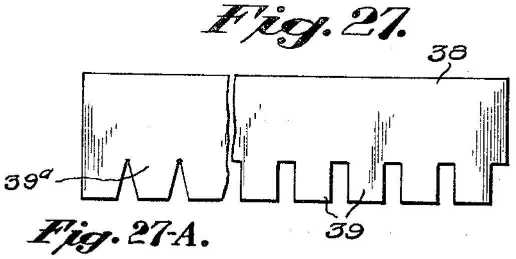
Fig. 28.
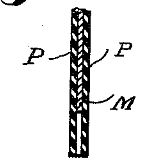
Fig. 29.
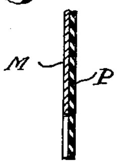
INVENTOR.
Jack O. Chertkof.
BY Robert [signature]
ATTORNEY United States Patent Office 2,958,946

Patented Nov. 8, 1960

2,958,946

DEVICE FOR TAKING IMPRESSIONS

Jack O. Chertkof, 19 W. Franklin St., Baltimore 1, Md.

Filed Mar. 2, 1959, Ser. No. 796,369

12 Claims. (Cl. 32—17)

This invention relates to a device for taking impressions.

While the improved device is not limited to a single use, it is particularly adapted for taking an impression of a prepared tooth for overcoming the inefficiencies of devices at present used for such purpose and which devices comprise tubes, cylinders or caps.

For securing accurate impressions of prepared teeth, it is necessary that the device being used embrace the teeth below the gum line, which cannot properly be attained by tubes, cylinders or caps as now used for such purpose.

In order that an impression device may be accurately and easily disposed below the gum line in proper embracing relation to a tooth, it has been found that the prerequisites of a device for such purpose be in the form of a collar, cylinder, or thimble and that at least the lower portion thereof must be substantially axially rigid while being radially elastic whereby the device is capable of being pushed downwardly over a prepared tooth while the lower end of the device yieldably engages the tooth below the gum line.

It is accordingly a primary object of the present invention to provide a device of the above noted general character which is highly efficient in use and which fully overcomes the objections to prior devices for such use.

A further and more specific object of the invention is to provide a device of tubular or thimble form which comprises an upper substantially rigid cylindrical portion and a lower portion whose wall is relatively rigid in an axial direction while being elastic in a radial direction.

Other objects and advantages of the invention will become apparent in the course of the following detailed description, taken in connection with the accompanying drawings, wherein—

Fig. 14 is a side elevational view of a still further embodiment of the invention.

Fig. 15 is a bottom view of the device of Fig. 14.

Fig. 16 is a side elevational view of a still further embodiment of the invention.

Fig. 17 is a bottom view of the device of Fig. 16.

Fig. 18 is a side elevational view of a still further embodiment of the invention.

Fig. 19 is a bottom view of the device of Fig. 18.

Fig. 20 is a side elevational view of a still further embodiment of the invention.

Fig. 21 is a bottom view of the device of Fig. 20.

Figs. 22 to 27, inclusive, are broken developed views of the walls of modified forms of the device.

Figs. 22A to 27A, inclusive, are also broken developed views showing further modified forms of the device.

Fig. 28 is a transverse sectional view of the lower end of the wall of a still further embodiment of the invention.

Fig. 29 is a view similar to Fig. 28 of a still further embodiment of the invention.

Figure 13:
Fig. 13 is a substantially enlarged fragmentary section of the lower wall structure of the devices of Figs. 1 to 12.

The several views on the drawings, except for Fig. 13, are substantially double the accurate size of the several devices disclosed.

Figure 1:
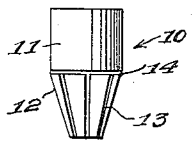
Fig. 1 is a side elevational view of an impression device in accordance with one embodiment of the invention.
Figure 3:
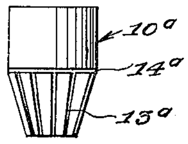
Fig. 3 is a side elevational view of a further embodiment of the invention.
Figure 5:
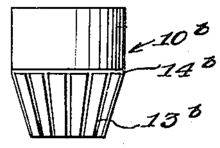
Fig. 5 is a side elevational view of a still further embodiment of the invention.
Figure 7:
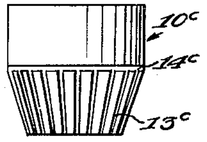
Fig. 7 is a side elevational view of a still further embodiment of the invention.
Figure 2:
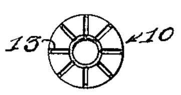
Fig. 2 is a bottom view of the device of Fig. 1.
Figure 4:
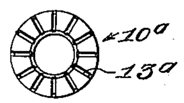
Fig. 4 is a bottom view of the device of Fig. 3.
Figure 6:
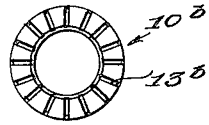
Fig. 6 is a bottom view of the device of Fig. 5.
Figure 8:
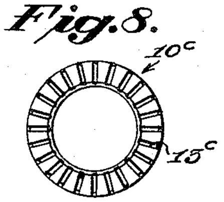
Fig. 8 is a bottom view of the device of Fig. 7.

Referring now in detail to the drawings, and first to Figs. 1 and 2 thereof, the device 10 as shown is of generally thimble form, open at both ends and is preferably of plastic material. The device 10 comprises a cylindrical wall 11 at its lower end. The cylindrical wall 11 is preferably smooth surfaced on its inner and outer walls while the frusto-conical wall 12 is provided with a series of upright external grooves 13 adjacent ends of which intersect a horizontal groove 14 disposed at the junction of the cylindrical wall 11 and the frusto-conical wall 12. The depth of the grooves relative to the thickness of the walls 11 and 12 is shown in Fig. 13.

The structures of Figs. 3–4, 5–6, and 7–8 are similiar to that of Figs. 1 and 2 but are of successively increased diameters and are designated $\mathbf{10^a}$, $\mathbf{10^b}$ and $\mathbf{10^c}$, respectively, with the respective grooves therein designated $\mathbf{13^a}$—$\mathbf{14^a}$, $\mathbf{13^b}$, $\mathbf{14^b}$, and $\mathbf{13^c}$, $\mathbf{14^c}$.

As will be apparent, this structure is substantially rigid axially thereof but the skirt or frusto-conical portion is further elastic transversely due to the provision of the grooves therein whereby the device is capable of being pushed downwardly over a prepared tooth and the grooved frusto-conical portions will easily find their way within the gum while same will also yieldably engage the portion of the tooth below the gum.

The various sizes of the device as shown in Figs. 1 to 8 readily adapt themselves to different characters of work being done.

Figure 9:
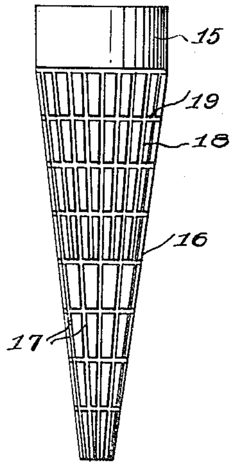
Fig. 9 is a side elevational view of a still further embodiment of the invention.
Figure 10:
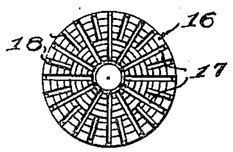
Fig. 10 is a bottom view of the device of Fig. 9.

The structure according to Figs. 9 and 10 is also of elastic material and comprises an upper relatively short cylindrical portion 15 and a relatively long frusto-conical lower portion 16 which is provided with a plurality of longitudinal grooves 17 which extend the full length of portion 16 and other grooves 18 disposed between grooves 17 and whose lower ends are in substantial spaced relation to the smaller end of the frusto-conical portion 16 whereby the circumferential spacing of grooves circumferentially is substantially uniform throughout the length of the frusto-conical portion 16. The upper ends of grooves 17 and 18 open into a horizontal groove at the junction of portions 15 and 16.

The frusto-conical portion 16 is provided with transverse grooves 19 in substantially uniformly spaced relation throughout the length of the frusto-conical portion.

Figure 11:
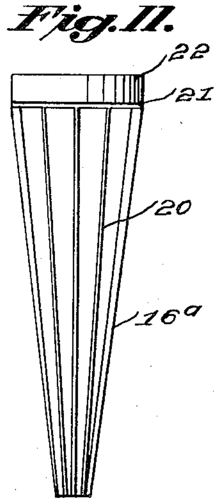
Fig. 11 is a side elevational view of a still further embodiment of the invention.
Figure 12:
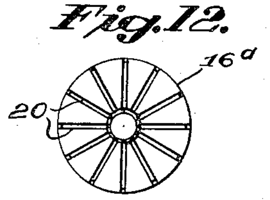
Fig. 12 is a bottom view of the device of Fig. 11.

The structure according to Figs. 11 and 12 is similar to that of Figs. 9 and 10 but the frusto-conical portion $\mathbf{16^a}$ is provided only with longitudinal grooves which extend throughout the length thereof and whose upper ends communicate with a transverse groove 21 at the junction of a relatively narrow cylindrical portion 22 and the frusto-conical portion $\mathbf{16^a}$. In this form the bottom of portion $\mathbf{16^a}$ is closed.

The devices of Figs. 1 to 13, while being of different dimensions, are similar to the extent that all comprise an upper plain cylindrical portion and a lower externally grooved frusto-conical portion and the varying sizes of the devices suit same for different forms of work. Each is capable of being pushed downwardly over a tooth or the like and the lower grooved end of each provides proper resiliency for effective contact with the tooth or the like.

Modified embodiments of the devices are shown in Figs. 14–15, 16–17, 18–19, and 20–21, which are successively of different sizes and correspond generally to the devices of Figs. 1–2, 3–4, 5–6, and 7–8. In the former, however, the devices are wholly of relatively thin metal construction and which respectively comprise an upper relatively long cylindrical portion 24, 24[a], 24[b], and 24[c] from which depend tongues 25, 25[a], 25[b], and 25[c], which are disposed in frusto-conical form and which are transversely yieldable.

In the use of metal the lower frusto-conical portion must be circumferentially broken for proper resiliency. Should it be desired, however, to have a circumferentially continuous frusto-conical portion, a sleeve of elastic material, such as plastic or rubber may be disposed on either the inner or the outer wall of the tongued frusto-conical portion or on both sides as is indicated in Figs. 28 and 29. The plastic sleeve is also applicable to the devices shown in Figs. 14 to 27.

Further embodiments of the invention are shown in Figs. 22 to 27, inclusive, and in each figure the respective device is shown prior to being rolled into thimble form. The purpose of these views is to disclose various forms of member gripping tongues in the metal type construction of the devices.

In Fig. 22 the blank 28 is shown as being provided with yieldable tongues 29. In Fig. 23 the blank 30 is shown as being provided with wider tongues 31 than the tongues 29 in Fig. 22. In Fig. 24 the blank 32 is shown as being provided with relatively narrow member gripping tongues 33.

The blanks 34, 36 and 38 shown in Figs. 25, 26 and 27, respectively, are provided with different width tongues and spaces therebetween.

As is indicated in Figs. 22 to 27, the several blanks are of a length to provide thimbles of different diameters to suit different characters of work done thereby.

In Figs. 22 to 27, the blanks are provided with rectangular spaces or notches between the tongues, while in Figs. 22A to 27A, the spaces or notches are triangular, whereby the tongues 29[a] to 39[a] will have their side edges tapered toward the ends thereof. In the use of the tapered tongues, the plastic sleeve P may not be required.

From the above description of the several structural embodiments of the invention it will be apparent that the radially elastic portion of the thimble may be entirely of metal, metal with plastic on one face thereof, metal with plastic on both faces thereof and other arrangements whereby the device will have substantial rigidity axially thereof while the member engaging end thereof is radially elastic.

Having set forth the invention in accordance with certain specific structural embodiments thereof, what is claimed and desired to be secured by U. S. Letters Patent is—

1. A device for taking an impression of a prepared tooth, comprising a tubular member including an upper substantially rigid cylindrical portion and a downwardly converging lower portion co-axial with said upper portion and whose wall is relatively rigid in an axial direction while being yieldable in a radial direction for yieldably engaging and conforming with a tooth below the gum line.

2. A device according to claim 1, wherein said lower portion is of frusto-conical form and wherein the wall thereof is provided with circumferentially spaced external grooves extending in the direction of the axis thereof.

3. A device according to claim 2, together with a groove disposed at right angles to the axis of the device and being disposed at the upper ends of said circumferentially spaced grooves.

4. A device according to claim 3 together with additional circumferentially spaced grooves disposed between said first named circumferentially spaced grooves, and further additional grooves disposed at right angles to the axis of the device.

5. A device according to claim 3, wherein said device is of plastic material, and said grooves being of rectangular form in cross section.

6. A device according to claim 2 wherein said upper and lower portions are of substantially the same axial length.

7. A device according to claim 2, wherein said lower portion is of substantially greater axial length than said upper portion.

8. A device according to claim 2 wherein said lower portion is of substantially less axial length than said upper portion.

9. A device for taking an impression of a prepared tooth comprising a tubular member including an upper cylindrical portion, and a lower portion comprising a plurality of circumferentially disposed laterally yieldable downwardly converging tongues depending from the lower end of said cylindrical portion and having free ends, said tongues being closely arranged with respect to each other.

10. The structure according to claim 9, wherein said tongues are normally downwardly and inwardly inclined relative to said cylindrical portion and the axis thereof.

11. The structure according to claim 10, wherein the lower ends of said tongues are normally in resilient engagement.

12. The structure according to claim 10, wherein said tongues are disposed in symmetrical relation to the axis of said cylindrical portion.

References Cited in the file of this patent

UNITED STATES PATENTS

| | | |
|---|---|---|
| 135,391 | Way | Jan. 28, 1873 |
| 1,812,008 | Lace | June 30, 1931 |
| 1,814,020 | Armstrong | July 14, 1931 |
| 1,971,438 | Yoder | Aug. 28, 1934 |
| 2,455,244 | Evans | Nov. 30, 1948 |
| 2,507,535 | Madsen | May 16, 1950 |